United States Patent
Yamada et al.

(10) Patent No.: US 7,598,470 B2
(45) Date of Patent: Oct. 6, 2009

(54) SINKER ELECTRIC DISCHARGE MACHINING METHOD AND APPARATUS

(75) Inventors: Hisanori Yamada, Yokohama (JP); Yoshio Shiratori, Yokohama (JP)

(73) Assignee: Sodick Co., Ltd., Kanagawa (JP)

( * ) Notice: Subject to any disclaimer, the term of this patent is extended or adjusted under 35 U.S.C. 154(b) by 189 days.

(21) Appl. No.: 10/580,154

(22) PCT Filed: Mar. 30, 2005

(86) PCT No.: PCT/JP2005/006803

§ 371 (c)(1),
(2), (4) Date: May 19, 2006

(87) PCT Pub. No.: WO2005/099951

PCT Pub. Date: Oct. 27, 2005

(65) Prior Publication Data

US 2008/0067154 A1     Mar. 20, 2008

(30) Foreign Application Priority Data

Mar. 30, 2004   (JP) ............................. 2004-097350

(51) Int. Cl.
*B23H 7/20* (2006.01)
*B23H 7/28* (2006.01)
(52) U.S. Cl. .................. 219/69.17; 219/69.13
(58) Field of Classification Search .............. 219/69.13, 219/69.17, 69.18; 700/162
See application file for complete search history.

(56) References Cited

U.S. PATENT DOCUMENTS

| | | | | |
|---|---|---|---|---|
| 4,361,745 A | * | 11/1982 | Rupert et al. ............. 219/69.13 |
| 5,091,620 A | * | 2/1992 | Mohri et al. ............. 219/69.13 |
| 5,118,915 A | * | 6/1992 | Magara ................... 219/69.13 |
| 5,514,941 A | * | 5/1996 | Kita ........................... 318/569 |
| 5,693,240 A | * | 12/1997 | Magara et al. ........... 219/69.13 |
| 5,756,955 A | * | 5/1998 | Goto et al. ............... 219/69.13 |
| 6,907,311 B2 | * | 6/2005 | Sendai et al. ............... 700/162 |
| 7,259,347 B2 | * | 8/2007 | Sasaki et al. ............. 219/69.13 |

FOREIGN PATENT DOCUMENTS

| | | | | |
|---|---|---|---|---|
| GB | 2329041 A | * | 3/1999 |
| JP | 57-41131 A | * | 3/1982 |
| JP | 60-3933 | | 1/1985 |
| JP | 62-173142 | | 7/1987 |
| JP | 63-39730 A | * | 2/1988 |
| JP | 01-289624 | | 11/1989 |
| JP | 05-200626 | | 8/1993 |
| JP | 2001-009639 | | 1/2001 |
| WO | WO-94/26454 A1 | * | 11/1994 |

\* cited by examiner

*Primary Examiner*—Geoffrey S Evans
(74) *Attorney, Agent, or Firm*—McDermott Will & Emery LLP

(57) ABSTRACT

An electric discharge machining method of removing material having a dimension (d) and a removal surface area (S) from a workpiece. A removal volume (V) of the material to be removed is obtained based on the dimension (d) and the removal surface area (S). Machining conditions are set, and a removal volume rate (Vm) corresponding to the set machining conditions is obtained. Machining time (T) is determined based on the removal volume (V) and removal volume rate (Vm). The electric discharge machining is completed when the machining time (T) has elapsed from the start of electric discharge machining.

1 Claim, 4 Drawing Sheets

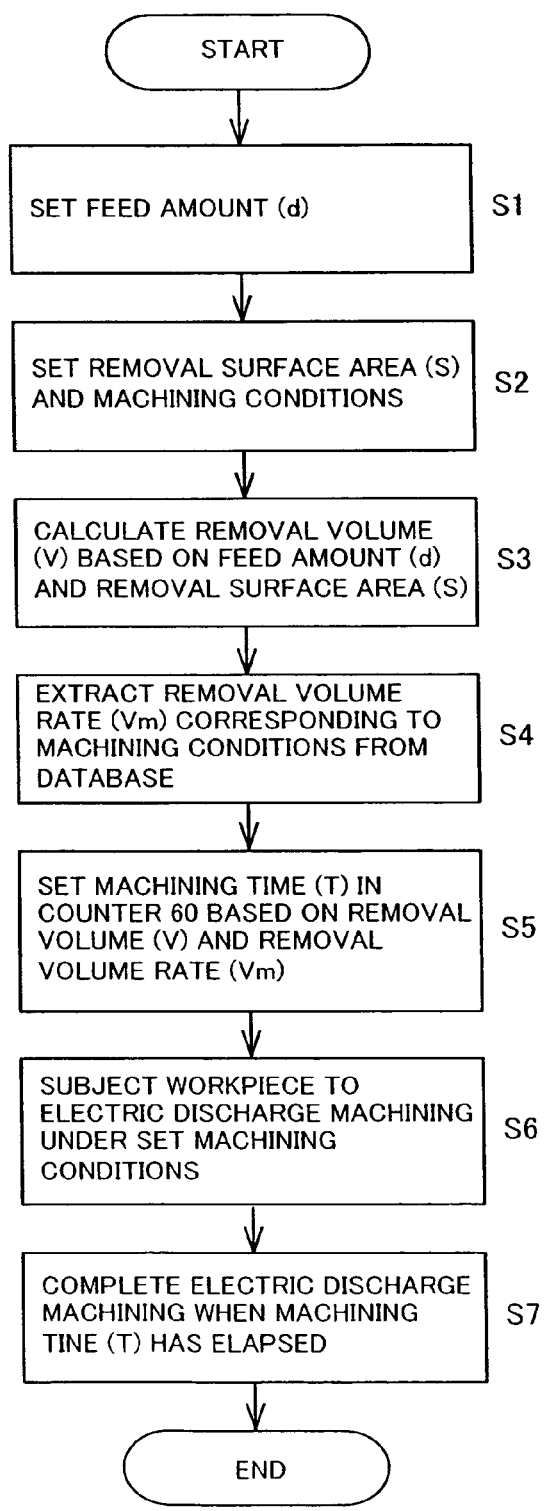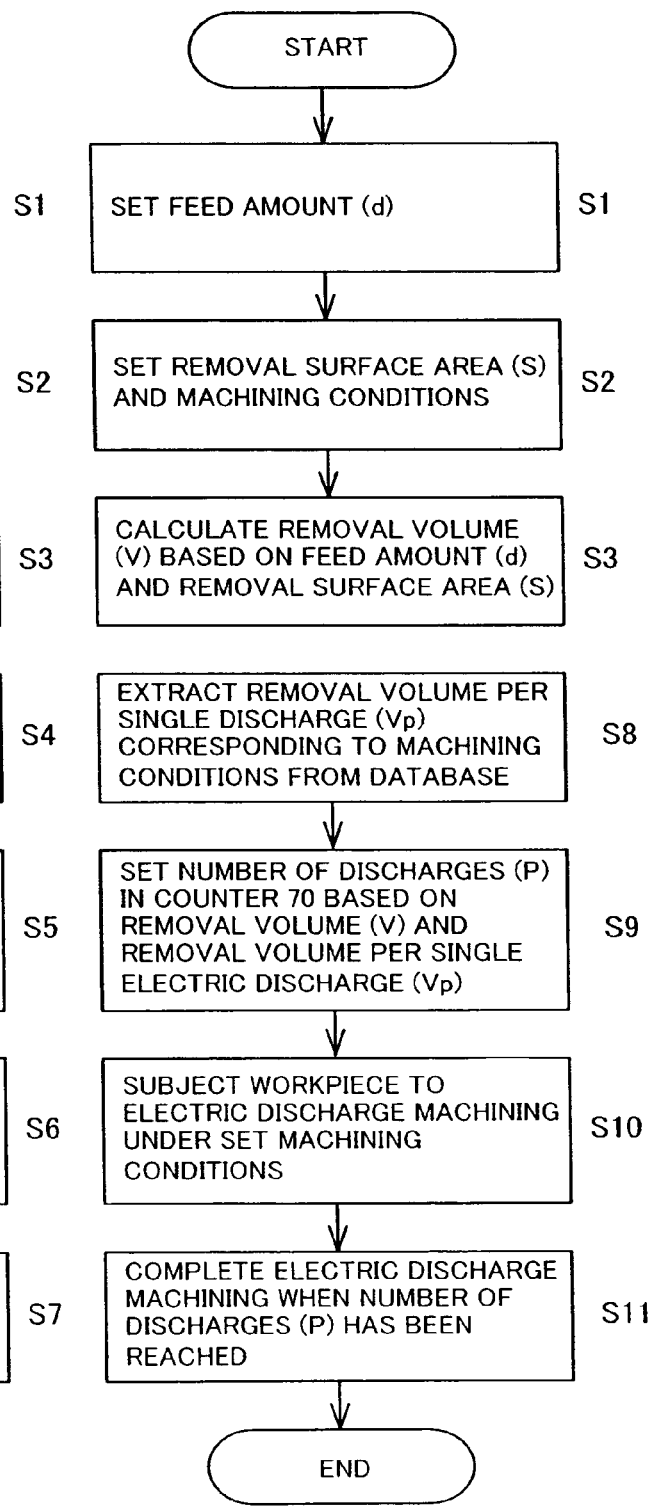

SINKER ELECTRIC DISCHARGE MACHINING METHOD AND APPARATUS

CROSS-REFERENCES TO RELATED APPLICATIONS

The present application is the National Stage of International Application No. PCT/JP2005/006803, filed on Mar. 30, 2005, and claims the benefit of priority of Japanese Patent Application No. JP2004-097350, filed on Mar. 30, 2004.

FIELD OF THE INVENTION

The present invention relates to a sinker electric discharge machining method for forming a required cavity in a conductive workpiece by causing electric discharge in a microscopic gap formed between a tool electrode and the conductive workpiece.

BACKGROUND OF THE INVENTION

Before carrying out electric discharge machining, a tool electrode is manufactured, having a shape that is the complement of a cavity to be formed, and having a size that is slightly reduced compared to the cavity. The tool electrode is positioned close enough to a workpiece to induce electric discharge. A microscopic gap between the tool electrode and the workpiece is filled with dielectric fluid.

If a power pulse is applied to the gap, after a delay time an electric discharge occurs and electrical current begins to flow across the gap. The delay time depends on the state of the gap and can not be predicted. If the application of the power pulse to the gap is stopped, insulation is restored into the gap. Thus, electric discharge is intermittently generated in the gap, and material is removed a little at a time from the workpiece. Pieces of the removed material are called chips, and are washed away from the gap by the dielectric fluid. The gap is restricted to a size that enables electric discharge to be efficiently induced. The size of the gap is a few pm to a few tens of μm. The tool electrode is moved a little at a time in a Z axis direction towards the workpiece, in response to removal of material from the workpiece.

A conventional sinker electric discharge machining apparatus includes a computerized numerical controller and an automatic programming device. The computerized numerical controller controls movement of the tool electrode and supply of power pulses etc. in accordance with a numerical controller (NC) program. Data representing the size and surface roughness of a cavity to be formed, material properties of the tool electrode and workpiece, etc. is input to the automatic programming device. Based on such data, the automatic programming device automatically creates an NC program for forming the cavity in a minimum amount of machining time. A process for forming the cavity is divided into a plurality of steps in which power pulse conditions and feed amount are set. The feed amount is a distance that the tool electrode is advanced in the Z axis direction towards the workpiece. If the tool electrode is moved by the set feed amount, the process proceeds to the next step in accordance with the NC program. At the next step, the setting of the power pulse conditions is switched. The power pulse conditions include, for example, on-time, off-time, current peak and voltage. In a first step, the feed amount is a distance from a reference position. Normally, the reference position is a position located away from an upper surface of the workpiece in the Z direction by a distance corresponding to a gap that will enable electric discharge to be induced. In the first step, a large power pulse is supplied to the gap, and the cavity is rough machined in the workpiece. If the large power pulse is supplied to the gap, the time required for machining is shortened, but the machined surface is undesirably rough. The feed amount in a second step is an additional distance from the tool electrode position at the time that the first step is completed. The feed amount in a third step is an additional distance from the tool electrode position at the time that the second step is completed. As the process advances to the second step and the third step of the process, the power pulse applied to the gap becomes smaller. In a final finishing step, extremely small power pulses are adopted for the purpose of making the surface roughness of the cavity fine. In the finishing step, ideally, the cavity is formed to the required dimensions.

In actual fact, however, the undesired removal of excess material from the workpiece constitutes a fatal mistake, which means that the cavity is often formed a few μm to over ten pm smaller than the required dimensions. The dimensions of the cavity are measured after formation of the cavity. Before measurement, the workpiece is washed and chips that are stuck to the workpiece are completely removed. In this way, an error between the measured dimensions and the required dimensions is obtained. The fact that surplus material having a dimension of a few μm to over ten μm remains may not be a major problem. However, in recent years, dimensional precision of a few pm or less has become necessary. In the manufacture of certain products, dimensional precision of within 1 μm has become necessary. A second process for removing surplus material without impairing the low surface roughness is called "additional machining".

FIG. 5 shows a tool electrode 17 and a workpiece 18 before additional machining. Z represents the dimension of material to be removed, of a few μm to over ten μm. A represents the position of the tool electrode at the time when the finishing step is completed. A feed amount dZ equal to value Z is set in an NC program. In the additional machining a problem often arises where the NC program terminates without electric discharge being induced, even if the tool electrode 17 is moved from position A to position B. A gap size that at which electric discharge can be induced is mainly dependent on the magnitude of the power pulse. However, even under the same power pulse conditions, the gap size at which electric discharge can be induced differs due to the amount of chips present. Value H represents the gap size at the time where the finishing step is completed. Value G represents the gap size at the time where the additional machining starts. Electric discharge generated between the tool electrode and the workpiece is called primary discharge. Electric discharge arising through the microscopic chips is called secondary discharge. During machining, the chips float in the gap or attach to the workpiece. It is well known that if a greater amount of chips increases the occurrence of secondary discharge, the gap size is increased. At the time where additional machining starts, there are hardly any chips because of the washing at the time of measurement. Therefore, if an error e between the value H and the value G is larger than the value Z, electric discharge machining cannot be accomplished at all.

Japanese patent publication 2001-9639 discloses causing conductive powder to be attached to the surface of the workpiece, in order to prevent variation in the gap size.

Japanese patent publication 60-3933 discloses an electric discharge machine provided with a timer circuit capable of setting machining time. In a finishing step for removing very fine material, it is possible to terminate machining when the machining has reached a set time, instead of using feed amount.

The object of the present invention is to provide a sinker electric discharge machining method and device for accurately removing material having a very small size of a few µm to over ten µm using electric discharge.

SUMMARY OF THE INVENTION

In order to achieve the above described object, the electric discharge machining method of one aspect of the present invention comprises the steps of: setting machining conditions, obtaining a removal volume (V), obtaining a removal volume rate (Vm) corresponding to the set machining conditions, setting machining time (T) based on the removal volume (V) and the removal volume rate (Vm), electric discharge machining a workpiece under the set machining conditions, and completing electric discharge machining when the set machining time (T) has elapsed from the start of electric discharge machining.

According to another aspect of the present invention, the electric discharge machining method comprises the steps of: setting machining conditions, obtaining a removal volume (V), obtaining a removal volume per single discharge (Vp) corresponding to the set machining conditions, setting a number of electric discharges (P) based on the removal volume (V) and the removal volume per single discharge (Vp), electric discharge machining a workpiece under the set machining conditions, and completing electric discharge machining when the set number of discharges (P) have been completed from the start of electric discharge machining.

Preferably, the removal volume (V) is obtained based on a dimension of the material to be removed (d) and a removal surface area (S).

According to yet another aspect of the present invention, a sinker electric discharge machining apparatus for machining a workpiece using a tool electrode includes a power supply device (1) for supplying a current pulse having a current peak of 0.2A-2A and an on-time of 0.5 µseconds to 5 µseconds to a gap formed between the tool electrode and the workpiece, a storage device (40) for storing a database correlating a plurality of removal volume rates (Vm) with corresponding sets of machining conditions, and storing a removal volume (V), an input device (20) for setting a selected set of machining conditions, a calculating device for extracting a removal volume rate (Vm) corresponding to the selected set of machining conditions from the storage device, and calculating a machining time (T) based on the removal volume (V) and the extracted removal volume rate (Vm), and a time counter device (60) for completing electric discharge machining when the machining time (T) has elapsed from a start of electric discharge machining.

According to a still further aspect of the present invention, a sinker electric discharge machining apparatus for machining a workpiece using a tool electrode includes a power supply device (1) for supplying a power pulse having a current peak of 0.2A-2A and an on-time of 0.5 µseconds to 5 µseconds to a gap formed between the tool electrode and the workpiece, a storage device (40) for storing a database correlating a plurality of removal volumes per single discharge (Vp) with corresponding sets of machining conditions, and storing a removal volume (V), an input device (20) for setting a selected set of machining conditions, a calculating device for extracting a removal volume per single discharge (Vp) corresponding to the selected set of machining conditions from the storage device, and calculating a number of electric discharges (P) based on the removal volume (V) and the extracted removal volume per single discharge (Vp), and a discharge counter device (70) for completing electric discharge machining when the number of electric discharges (P) have been completed from a start of electric discharge machining.

According to the present invention, even when a variation in gap size arising under the same power pulse conditions is larger than a feed amount, it is possible to remove material of microscopic dimensions.

BRIEF DESCRIPTION OF THE DRAWINGS

FIG. 3 is a flowchart showing a sinker electric discharge machining method of the present invention.

FIG. 4 is a flowchart showing a sinker electric discharge machining method of the present invention.

DETAILED DESCRIPTION OF THE INVENTION

A sinker electric discharge machining apparatus and machining method will now be described in detail with reference to FIG. 1, FIG. 2, FIG. 3, FIG. 4 and FIG. 5.

Figure 1:
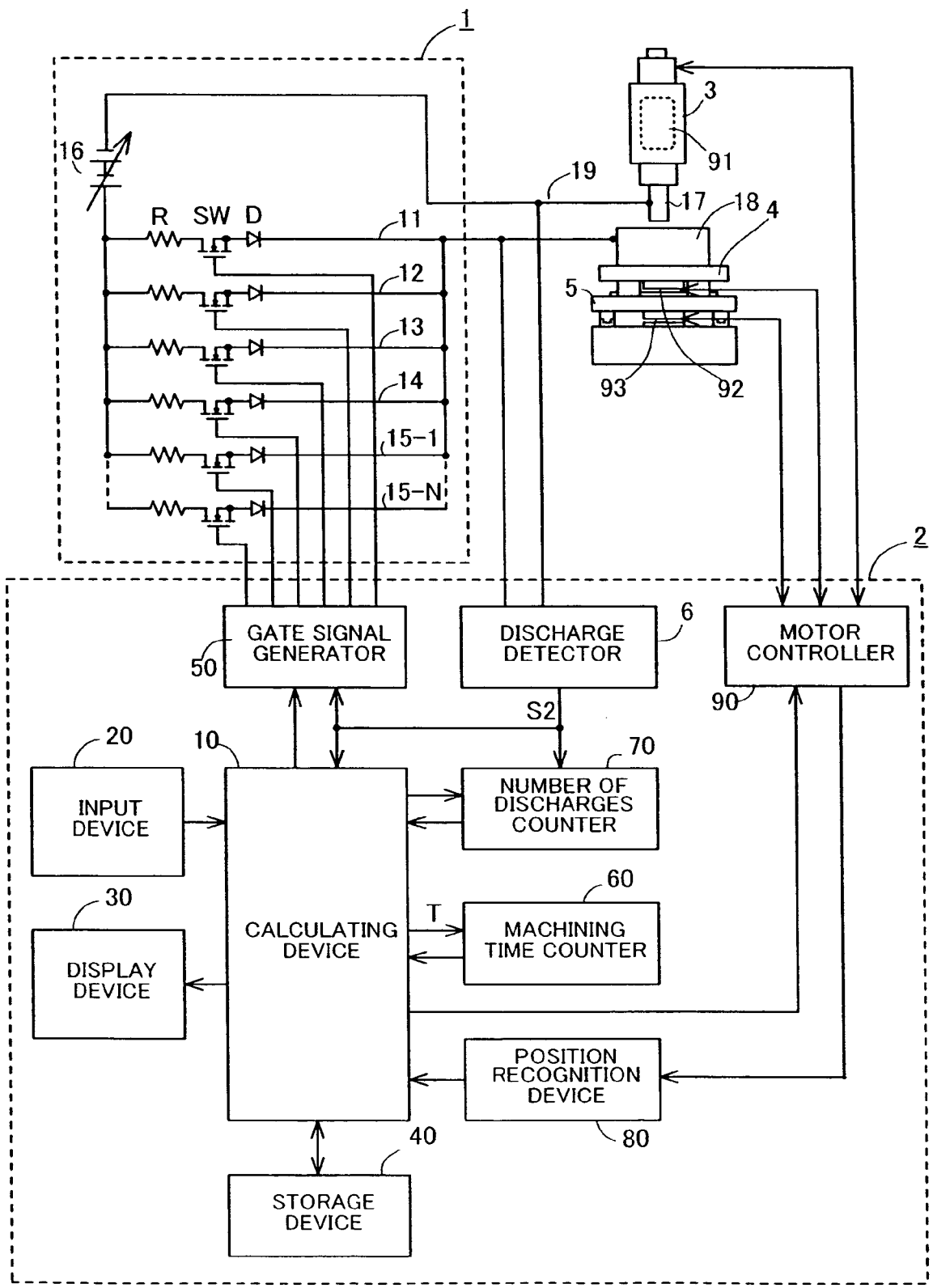
FIG. 1 is a block diagram of a sinker electric discharge machining apparatus of the present invention.

As shown in FIG. 1, the electric discharge machining apparatus includes a power supply 1 and a controller 2, in addition to a sinker electric discharge machine. The sinker electric discharge machine includes a head 3 to which a tool electrode 17 is attached, and a table 4 on which the workpiece 18 is fixed. The head 3 is provided on a column (not shown), and is movable in the Z axis direction by a linear servo motor 91. The table 4 is mounted on a saddle 5 and is movable in the X axis direction by a linear servo motor 92, while the saddle 5 is mounted on a bed and is movable in the Y axis direction by a linear servo motor 93. The Z axis is the vertical axis, and orthogonal XY axes are horizontal axes.

The power supply 1 is one example of means that can repeatedly supply a current pulse having a current peak of 0.2A-2A and an on-time of 0.5 µsecond-5 µseconds to a gap. The power supply 1 includes a switching circuit and a d.c. power supply 16 connected in series with the switching circuit. The switching circuit is made up of series circuits 11, 12, 13, 14, 15-1-15-N having switching elements SW, current limiting resistance elements R, and backflow prevention diodes D connected in series. The plurality of series circuits 11, 12, 13, 14, 15-1-15-N are all connected in parallel with each other. One terminal of the d.c. power supply 16 is connected to the tool electrode 17, while the other terminal is connected to the workpiece 18. The output voltage of the d.c. power supply 16 can be set to 90V, 120V, 150V and 200V. The power supply 1 and the sinker electric discharge machine are connected using a low inductance cable 19, such as a shielded cable or coaxial cable. The on-time and current peak of a current pulse flowing in the gap between tool electrode 17 and workpiece 18 is determined by on/off operation of the plurality of switching elements SW. Switching element SW is a field effect transistor capable of high speed on/off operation of less than 1 µsecond, and preferable 500 nanoseconds. This makes it possible to supply a current pulse having an on-time of 0.5 µseconds-5 µseconds to the gap, and makes it possible to increase the frequency of repeating electric discharge.

The series circuits 15-1-15-N respectively include current limiting resistance elements R of 30Ω, and these series circuits are used from the rough step to the finishing step. For example, if only four series circuits 15-1-15-4 are connected to a 90V d.c. power supply 16, it is possible to supply a current pulse having a current peak of 12A to the gap.

The series circuits 11-14 are circuits for supplying a current pulse having a current peak of 2A or less to the gap. The series circuits 11-14 respectively include current limiting resistance elements R of 450Ω, 240 Ω, 120 Ω and 60 Ω. A current pulse having a current peak of 0.2A is supplied from the 90V d. c. power supply 16 to the gap by means of the series circuit 11. Current pulses having current peaks of about 0.37A, 0.75A, and 1.5A are supplied to the gap from the d.c. power supply by means of the series circuits 12, 13 and 14, respectively. The series circuit 11-14 can control the energy of a single current pulse flowing through the gap to be constant, and so are suitable for additional machining. For example, using a copper tool electrode, additional machining is carried out on a steel workpiece having a surface area of 5×10 mm . In this case, material is removed at a rate of 0.08 μm/minute-0.1 μm/minute by supplying a current pulse having an on-time of 1 μsecond and a current peak of 0.4A to the gap.

An additional d.c. power supply of 200V or higher (not shown) having a resistance element of 150Ω or greater connected is preferably connected in parallel with the d.c. power supply 16. The use of this additional d.c. power supply enlarges the gap, and has the effect of stabilizing the additional machining. In addition, a delay time from application of a voltage to the gap until the time that electric discharge is generated is made as small as possible.

The controller 2 includes a calculating device 10, an input device 20, a display device 30, a storage device 40, a gate signal generator 50, a position recognition device 80, and a motor controller 90. The calculating device 10 is basically a main control circuit made up of at least one CPU, a cache memory, a ROM, a CPU controller and some interfaces. Preferably, the calculating device 10 implements a computer aided design system, and has three-dimensional shape data for the cavity or the tool electrode 17. The input device 20 contains a keyboard, a switch, a mouse and a drive device as storage medium. The display device 30 is a CRT or an LCD. The storage device 40 has a memory module (SDRAM) and a hard disc drive. The motor controller 90 controls the linear servo motors 91, 92, 93 in accordance with movement command data from the calculating device 10. A position detection signal is sent from a linear scale (not shown) attached to the sinker electric discharge machine, to the motor controller 90 and the position recognition device 80. The position recognition device 80 compares the detected position to the set feed amount.

The controller 2 also includes at least one of a machining time counter 60 and a number of discharges counter 70. The machining time counter 60 is comprised, for example, of a comparator, an adder, and a clock pulse generator. The number of discharges counter 70 is comprised of, for example, a comparator and a counter. A discharge detector 6 generates a detection signal S2 if it is detected that current pulse caused by electric discharge has started to flow through the gap. The detection signal S2 is supplied to the calculating device 10, the gate signal generator 50, and the number of discharges counter 70.

Figure 2:
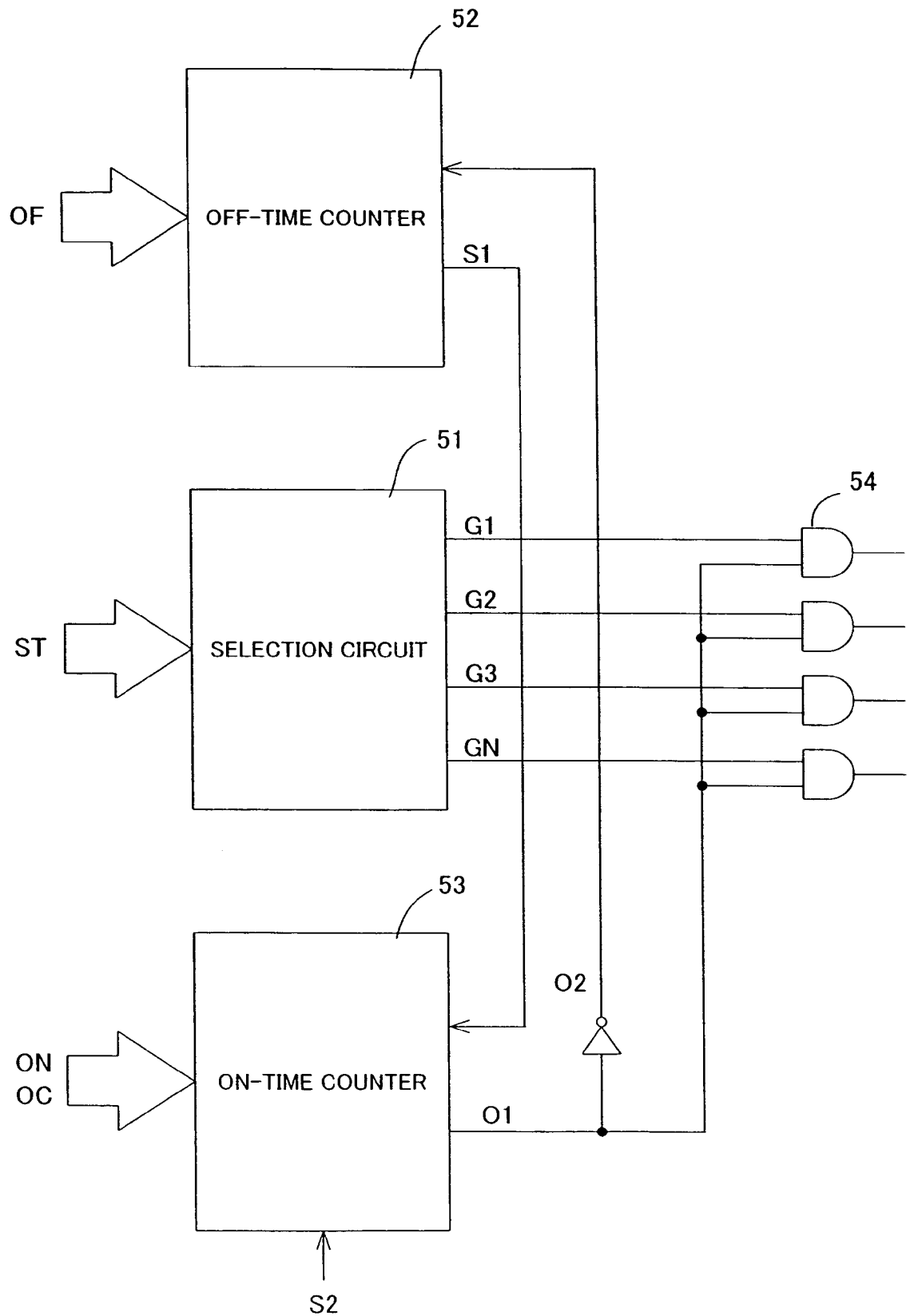
FIG. 2 is a block diagram of a gate signal generator of FIG. 1.

The gate signal generator 50 will now be described in detail with reference to FIG. 2. The gate signal generator 50 includes a selection circuit 51, an off-time counter 52 for counting off-time, and an on-time counter 53 for counting on-time. The selection circuit 51 is mainly composed of a storage circuit such as memory. The calculating device 10 supplies selection data ST to the selection circuit 51 according to a current peak set value. In accordance with the selection data ST, the selection circuit 51 outputs one or more signals from among the gate signals G1-Gn. Each of the output terminals of the selection circuit 51 are connected to gates of switching elements SW via AND gates 54. The calculating device 10 supplies data OF representing an off-time set value, to the off-time counter 52. When an output signal O1 of the on-time counter 53 is turned off, the off-time counter 52 starts counting. When the count reaches the off-time set value, the output signal S1 of the off-time counter 52 is turned on, and the count is cleared. The calculating device 10 supplies data ON representing an on-time set value, to the on-time counter 53. When an output signal S1 of the off-time counter 52 is turned on, the on-time counter 53 starts counting, and signal O1 is supplied to the AND gates 54. When the count reaches the on-time set value, the output signal O1 of the on-time counter 53 is turned off, and the count is cleared. At this time, an inverted signal O2 of the output signal O1 is turned on, and the off-time counter 52 is caused to start counting. The calculating device 10 selectively supplies data OC to the on-time counter 53, and the on-time counter 53 is provided with a data selector (not shown). If data OC is supplied to the on-time counter 53, the on-time counter 53 starts counting when the detection signal S2 is received.

Removal volume per single discharge Vp (mm$^3$) and removal volume rate Vm (mm$^3$/minute) are stored in the storage device 40 in database format. Removal volume per single discharge Vp and removal volume rate Vm are correlated to corresponding machining conditions. Machining conditions include the material of the tool electrode 17 and of the workpiece 18, and power pulse conditions. The value of Vp is the volume of material removed from the workpiece 18 with a single discharge. Removal volume rate Vm is the volume of material removed per device time. Values Vp and Vm are obtained by experimentation.

The sinker electric discharge machining method of the present invention will now be described in detail with reference to FIG. 3. The method is executed in the additional machining process using the machining time counter 60.

Figure 5:
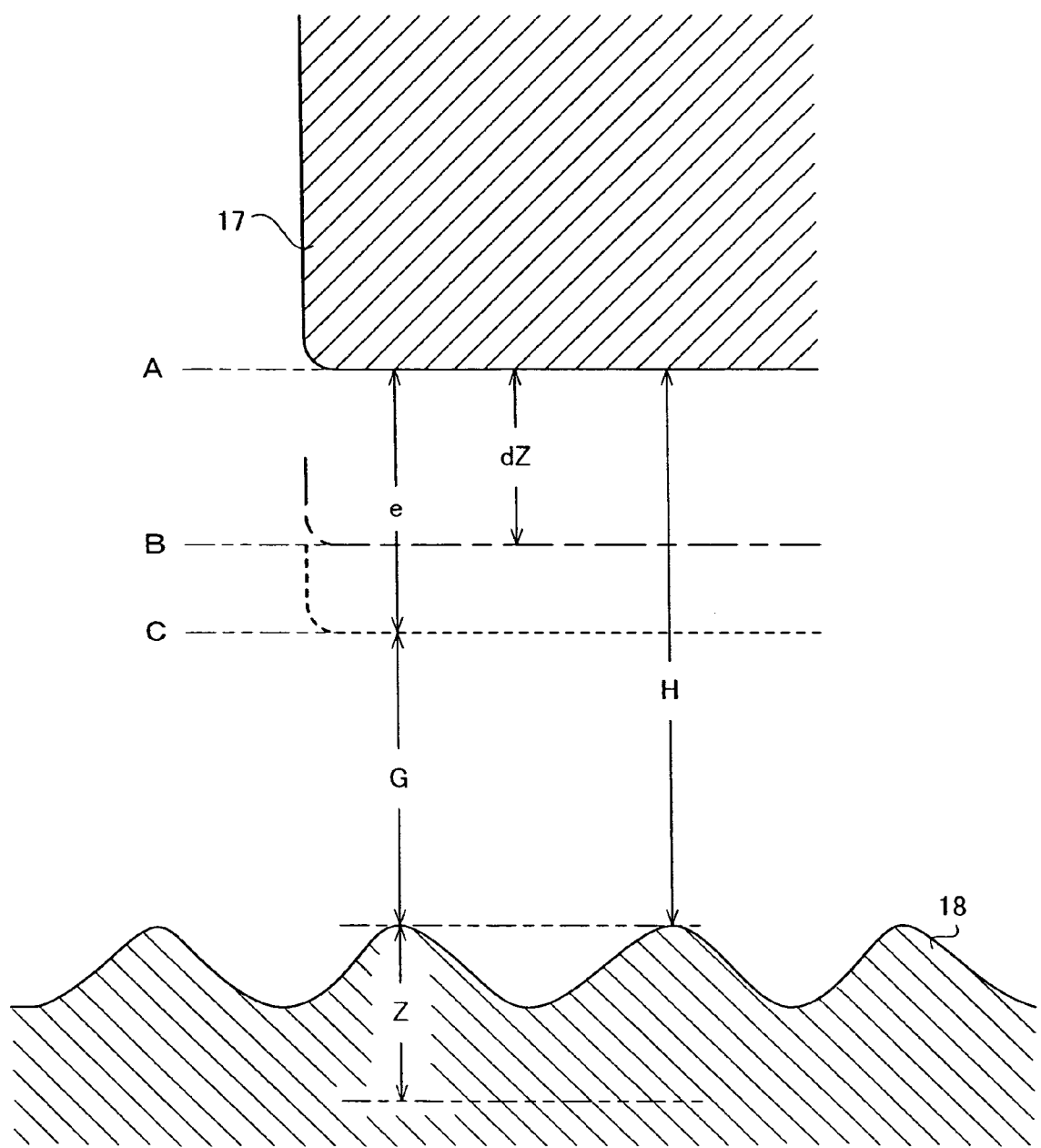
FIG. 5 is a cross sectional drawing of a tool electrode and a workpiece before additional machining.

In step S1, a feed amount d equivalent to the dimension Z of material to be removed is set using the input device 20. As shown in FIG. 5, the tool electrode 17 is moved to position C spaced apart from the workpiece 18 by the gap size G. In step S2, the removal surface area S (rnm$^2$) is set using the input device 20, and the set value for S is stored in the storage device 40. Alternatively, the calculating device 10 may set a removal surface area S based on three-dimensional shape data for the cavity or the tool electrode 17, and store the set value for S in the storage device 40. The machining conditions for removing material of 1 μm to over ten μm, and in many cases 1 μm to 5 μm, without impairing the small surface roughness of the surface finished in the finishing step, are set. Such machining conditions include on-time of 5 μsecond or less, and peak current of 0.2A-2A. The set feed amount d and machining conditions are translated into an NC program, and stored in the storage device 40. In step S3, the calculating device 10 reads the removal surface area S and feed amount d from the storage device 40, and calculates removal volume V (mm$^3$). Removal volume V is calculated according to the following equation.

$$V = S \times d$$

In step S4, the calculating device 10 extracts removal volume rate Vm corresponding to the set machining conditions from the data base in the storage device 40. In step S5, the calculating device 10 also extracts the removal volume V, and calculates the machining time T (minutes) required to remove material of the removal volume V according to the following equation.

$T=V/Vm$

The calculating device 10 sets the value T at the data terminal of a comparator inside the counter 60. In step S6, the calculating device 10 decodes the NC program, supplies data ON, OF and OC to the gate signal generator 50, and supplies a command signal to the motor controller 90. In this manner, the voltage of the power supply 1 is applied via the series circuits 11-14 to the gap, and electric discharge machining commences under the set machining conditions. Upon receipt of detection signal S2 from the discharge detector 6 by the calculating device 10, the counter 60 counts clock pulses. In step S7, when the count reaches the set value T, the comparator supplies a completion signal to the calculating device 10. In response to the completion signal, the calculating device 10 stops operation of the machining time counter 60, and stops supply of the command signal to the motor controller 90. The calculating device 10 also deletes selection data ST in the selection circuit 51 of the gate signal generator 50. In this manner, electric discharge machining is completed.

The sinker electric discharge machining method of the present invention will now be described in detail with reference to FIG. 4. The method is executed in the additional machining process using the number of discharges counter 70.

Description of steps S1-S3 has already been given, and so will be omitted. In step S8, the calculating device 10 extracts removal volume per single discharge Vp corresponding to the set machining conditions from the data base in the storage device 40. In step S9, the calculating device 10 also extracts the removal volume V, and calculates the number of discharges P required to remove material of the removal volume V according to the following equation.

$P=V/Vp$

The calculating device 10 sets the value P at the data terminal of a comparator inside the discharge counter 70. In step S10, which is the same as step S6, the voltage of the power supply 1 is applied via the series circuits 11-14 to the gap, and electric discharge machining commences under the set machining conditions. The discharge counter 70 counts the detection signal S2. In step 511, when the count of the number of discharges reaches the set value P, the comparator supplies a completion signal to the calculating device 10. In response to the completion signal, the calculating device 10 stops operation of the number of discharges counter 70, and stops supply of the command signal to the motor controller 90. The calculating device 10 also deletes selection data ST in the selection circuit 51 of the gate signal generator 50. In this manner, electric discharge machining is completed.

The above embodiments have been selected for the purpose of describing the gist and practical application of the present invention. Various improvements are possible with reference to the above description. The scope of the invention is defined by the scope of the appended claims.

The invention claimed is:

1. An electric discharge machining method for forming a cavity, comprising:
    setting a removal surface area (S);
    setting a dimension of material to be removed (d) from a workpiece and machining conditions;
    storing, utilizing a storage device, a database correlating a removal volume rate (Vm) with machining conditions;
    extracting, utilizing a calculating device, the removal volume rate (Vm) corresponding to the set machining conditions from the storage device, and calculating, utilizing the calculating device, a machining time (T) based on the removal surface area (S), the dimension of material to be removed (d) and the removal volume rate (Vm); and
    completing electric discharge machining of the workpiece with increase in dimension of the cavity when the machining time (T) has elapsed from starting electric discharge machining.

\* \* \* \* \*